(12) United States Patent
Choudhary

(10) Patent No.: US 7,729,296 B1
(45) Date of Patent: Jun. 1, 2010

(54) DISTRIBUTED BPDU PROCESSING FOR SPANNING TREE PROTOCOLS

(75) Inventor: Jagjit Choudhary, San Jose, CA (US)

(73) Assignee: Force 10 Networks, Inc., San Jose, CA (US)

( * ) Notice: Subject to any disclaimer, the term of this patent is extended or adjusted under 35 U.S.C. 154(b) by 322 days.

(21) Appl. No.: 11/899,893

(22) Filed: Sep. 7, 2007

(51) Int. Cl.
*H04L 12/28* (2006.01)
*G06F 15/16* (2006.01)

(52) U.S. Cl. .................................. 370/256; 709/208
(58) Field of Classification Search ............... None
See application file for complete search history.

(56) References Cited

U.S. PATENT DOCUMENTS 6,947,434 B2 * 9/2005 Hundscheidt et al. ....... 370/401
2004/0240398 A1* 12/2004 Ho et al. .................... 370/256
2006/0005097 A1* 1/2006 Ichikawa et al. ........... 714/745
2008/0232383 A1* 9/2008 Meier et al. ................ 370/401

* cited by examiner

*Primary Examiner*—Gregory B Sefcheck
*Assistant Examiner*—Nima Mahmoudzadeh

(57) ABSTRACT

A distributed spanning tree protocol is implemented on a modular packet switch. At least some port-specific spanning tree functionality, for instance a port receive state machine and/or a port transmit state machine, operates on a processor on a line port module. At least some bridge-specific spanning tree functionality operates on a processor on a management or control module. When the spanning tree is stable, the line port module processor handles routine spanning tree "hello" messages without having to involve the control module processor. This arrangement allows the switch to handle large and/or multiple spanning trees and large numbers of bridged ports without overloading the control module processor with routine spanning tree module communications.

18 Claims, 9 Drawing Sheets

DISTRIBUTED BPDU PROCESSING FOR SPANNING TREE PROTOCOLS

BACKGROUND

1. Field of the Invention

The present disclosure relates generally to spanning tree protocols, and more particularly to systems and methods for implementing a spanning tree protocol that is distributed among participating elements of a packet switch.

2. Description of Related Art

In packet networks, packet switches are often interconnected in hierarchical arrangements such as the exemplary network 100 shown in FIG. 1. Network 100 includes eight packet switches BR1 to BR8. Each switch has multiple ports (e.g., ports P11-P14 on BR1, ports P21-24 on BR2, etc.) that connect to ports on other switches in the network via links (the links may be, e.g., copper cable, fiber optic links, wireless links, etc.). The network could include other switches as well, and the switches generally include ports other than those shown (some large switches have many hundreds to over a thousand ports). One or more of the switches could also serve as a packet router, and other destination devices such as computer end stations, servers, routers, etc., also connect to the network, but are not shown. Although point-to-point links are shown, some media may allow multiple-access, e.g., more than two devices sharing a link.

To provide redundancy, a network such as network 100 purposely includes multiple possible paths that a packet could follow to move from one point in the network to another. Generally, the switches must agree on only one of these paths for each packet, or the packet may loop and/or be dropped without ever being delivered to its destination. When the switches all agree on a set of such paths for all traffic, the network is said to have "converged."

Spanning Tree Protocols (STPs) are often used in computer networks to maintain a reconfigurable loop-free network topology within a group of interconnected switches. Such protocols not only allow a network to initially converge, but also provide mechanisms for the network to reconverge to a new topology when links or switches fail or are added to a network. One well-known example of a STP, Rapid Spanning Tree Protocol (RSTP), is described in the IEEE 802.1D-2004 specification, published by the Institute of Electrical and Electronic Engineers and incorporated herein by reference. Some features and terminology from the RSTP specification that will be useful in the following description are introduced here in conjunction with FIG. 1.

According to RSTP, each switch that participates in a spanning tree is assigned a bridge priority, such that the operating switch having the best bridge priority (numerically lowest priority value) will be elected by the spanning tree as the root bridge. Each switch initially assumes that it is the root bridge. The switches advertise their bridge priorities to each other across the bridge-to-bridge links using protocol-specific packets known as Bridge Protocol Data Units (BPDUs). When a switch receives a BPDU advertising a bridge priority higher than the switch's own bridge priority, that switch knows that it will not be elected as the root bridge; conversely, if a switch receives no BPDU advertising a higher bridge priority, it continues to act as if it is the root bridge. Assuming that the switches in network configuration 100 are assigned a bridge priority in the same order as their respective numerical suffixes, all switches in the network will recognize BR1 as having the best bridge priority, and BR1 will become the root bridge for the configuration.

The ports of the bridges are each assigned a port role by the protocol. Through the interchange of BPDUs, the switches also learn which one, if any, of their ports will assume the role of a root port—the port that is closest to the root bridge in terms of port cost. Assume that all links shown in each tier of network 100 run at the same data rate and thus all ports on the same tier have the same single-link port cost, the root ports that will be selected by BR2-BR8 based on port cost are indicated by open circles adjacent the ports. In cases where two ports have the same port cost to reach the root bridge (for instance ports P23 and P24 on switch BR2), the bridge with the numerically lowest port number is selected as the root port. The root ports selected in network 100 include P23, P31, P41, P51, P61, P71, and P81.

The interchange of BPDUs also allows the switches to assign designated ports for each network segment—a designated port role is assigned to the port capable of sending the best BPDUs on the segment to which it is connected, where "best" generally means smallest port cost, with bridge priority/port priority used to break ties. The designated ports that will be selected by BR1-BR8 are indicated by black circles adjacent the ports. Thus all ports on BR1 connected to other switches in the network (ports P11, P12, P13, and P14) become designated ports, as their port cost to reach the root bridge is zero. The other designated ports selected in the network include P21, P22, P33-36, P43-46, P53-55, P63-65, P73-75, and P83-85.

The remaining ports shown in network 100—in this case ports P24, P32, P42, P52, P62, P72, and P82—are neither root nor designated ports. These ports assume a role of alternate ports and are illustrated in FIG. 1 with a bar drawn through the network connection near the port. Of course, a port can also become a disabled port if it malfunctions, the link and/or device to which the link connects malfunctions, or if manually disabled. A disabled port does not participate in any spanning tree calculations.

In addition to a port role, each port in the spanning tree also progresses through different port states as the spanning tree converges. Ports progress from a blocking state to a learning state to a forwarding state if they are root or designated ports, and remain in a blocking state if they are alternate ports. Blocking ports do not learn MAC (Media Access Control) addresses from received frames and do not forward frames. Based on these definitions, it can be verified that traffic received on each port of network 100 has a single path comprising only forwarding ports that it may follow to reach any other device (or network egress port) in the network.

One drawback of the FIG. 1 configuration is that it defines a common spanning tree for all traffic. The alternate/blocked ports in the topology represent unused bandwidth that could be useful, such as the bandwidth idle at ports P32, P42, and P24, were there a way to use it. With the advent of Virtual LANs (VLANs), this became possible for switches capable of using different Spanning Trees for different VLANs. Although other similar solutions exist, the most common multi-spanning tree solution is Multiple Spanning Tree Protocol (MSTP), defined in IEEE 802.1Q-2005, and incorporated herein by reference. MSTP allows a set of switches in a defined region to run multiple spanning tree overlays or instances on the same group of switches. In some of the spanning tree instances, a given port will be blocking, while in others, the same port will be forwarding. Thus traffic on different VLANs may follow different paths between the same two points in the network, even though traffic on each VLAN is confined to a single path as described for RSTP. This allows the network to achieve at least a rudimentary form of load balancing and utilize all ports.

In MSTP, each VLAN is assigned to one of 64 logical spanning tree instances. This is accomplished by populating a 4096-element table on each switch with an association between each of the 4096 possible VLAN IDs and one of the 64 logical spanning tree instances. When a switch receives a VLAN-tagged packet, it reads the VLAN ID for the packet and refers to the MSTP table (or a table derived from the MSTP table) to determine the appropriate spanning tree instance (e.g., forwarding port(s)) for that VLAN ID.

Within an MSTP region, only one set of BPDUs is propagated by each switch. The BPDU format for MSTP contains a fixed first section, followed by a variable number of configuration messages, one per MST instance. The BPDU format is as follows:

---
Protocol Identifier
Protocol Version Identifier
BPDU Type
CIST Flags
CIST Root Identifier
CIST External Path Cost
CIST Regional Root Identifier
CIST Port Identifier
Message Age
Max Age
Hello Time
Forward Delay
Version 1 Length = 0
Version 3 Length
MST Configuration Identifier
CIST Internal Root Path Cost
CIST Bridge Identifier
CIST Remaining Hops

--- followed by a variable number of configuration messages of the following format:

---
MSTI Flags
MSTI Regional Root Identifier
MSTI Internal Root Path Cost
MSTI Bridge Priority
MSTI Port Priority
MSTI Remaining Hops

---

The fixed first section contains information that is used to establish a Common Internal Spanning Tree (CIST) that will be used within the MSTP region as a default spanning tree for traffic not otherwise assigned, and represents the MSTP region as a virtual bridge to the outside world. Many of these fields correspond to RSTP fields in BPDUs used to establish an RSTP Spanning Tree. The MST configuration identifier field, however, identifies the MST group by an alphanumeric configuration name, a configuration revision number, and a digest value. Each switch calculates its MSTP digest value by hashing its VLAN-to-MSTP-instance mapping table with a known hash function, the "HMAC-MD5" algorithm described in Internet Engineering Task Force document RFC 2104. The digest value transmitted within a BPDU must match the internally-calculated digest value in order for a switch to recognize the BPDU as one originating from its MSTP region. Thus if the VLAN mapping tables for two connected switches do not match exactly, the two switches will transmit BPDUs with different digest values. Consequently, the two switches will not cooperate in a common MSTP region, and each assumes that the port on which it receives the differing digest value (or no digest value) is at the MSTP region boundary.

Assuming that the MST configuration identifier digest matches a switch's digest, the switch will participate in establishing a CIST for the region and a number of MST Instances (MSTIs) equal to the number of MSTI configuration messages. For each MSTI, the corresponding MSTI Configuration Message contains bridge and port priorities used to calculate a spanning tree for that instance. By assigning different bridge and/or port priorities in different MSTIs, the MSTIs may be designed to elect different root bridges and may each block and forward on different port combinations to achieve a more load-balanced topology.

A switch may run standard STP, RSTP, MSTP, or some other variant of these, or even multiple STP processes and/or varieties for different ports. Generally, however, all STP variants follow the same general bridge framework 200, shown in FIG. 2. Simplified to a two-layer bridge, a switch is comprised of MAC (Media Access Control) entities for each port (ME1 and ME2), physical entities for each port (PHY1 and PHY2), a MAC relay entity (MRE), and higher-layer entities such as the bridge protocol entity BPE.

MAC entities ME1 and ME2 receive framed packets from their respective physical layer devices, and transmit framed packets on their respective physical layer devices. The logical link control (LLC) sublayer of each MAC entity is responsible for multiplexing/demultiplexing packets with protocols corresponding to the higher-layer entities with the regular traffic that passes through the bridge. Thus LLC1 and LLC2, respectively, pass spanning tree protocol BPDUs from the frame receive functions to bridge protocol entity BPE, and from bridge protocol entity BPE to the frame transmit functions.

The bridge protocol entity BPE operates, e.g. as described above for RSTP and/or MSTP, to determine port roles and port states for the ports represented by ME1, ME2, and any other switch ports in the device. The bridge protocol entity uses this information to set port state INFO1 and INFO2 for each port in the MAC relay entity MRE. If the port state indicates the port is enabled but discarding, frames passed from the MAC entity to the MAC relay entity are dropped. In the port state indicates the port is forwarding, the MAC relay entity uses a filtering database to look up one or more forwarding ports for a frame passed to it from a MAC entity, using e.g., a destination MAC address or VLAN ID to match a filtering database entry. As frames pass through the MAC relay entity, a learning process associates the frames' source MAC addresses with the ports on which the frames were received in order to update the filtering database and learn new station IDs.

BRIEF DESCRIPTION OF THE DRAWINGS

The present invention can be best understood by reading the specification with reference to the following Figures, in which.

DETAILED DESCRIPTION

Figure 1:
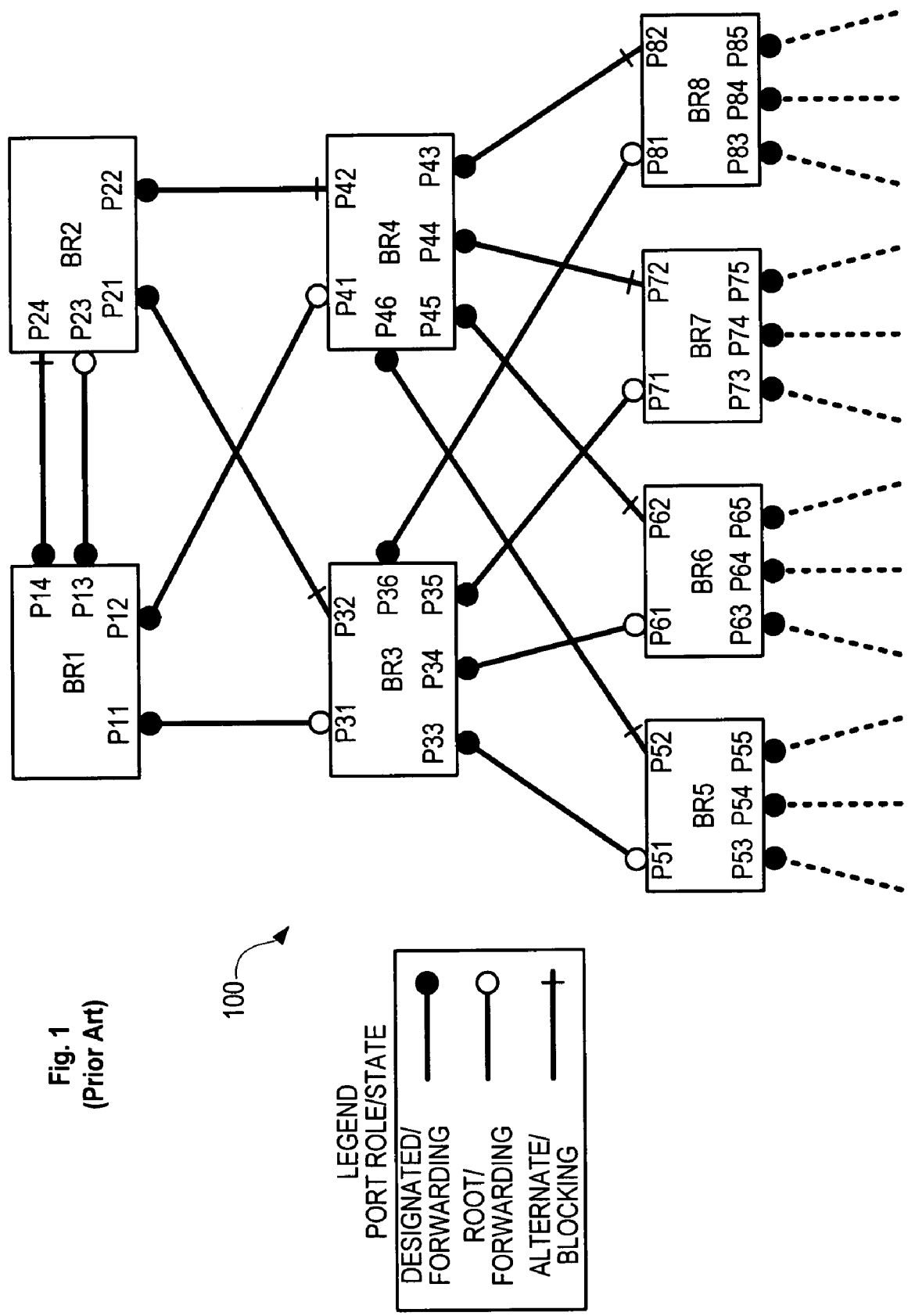
FIG. 1 illustrates a prior art network configuration for an exemplary spanning tree topology.
Figure 2:
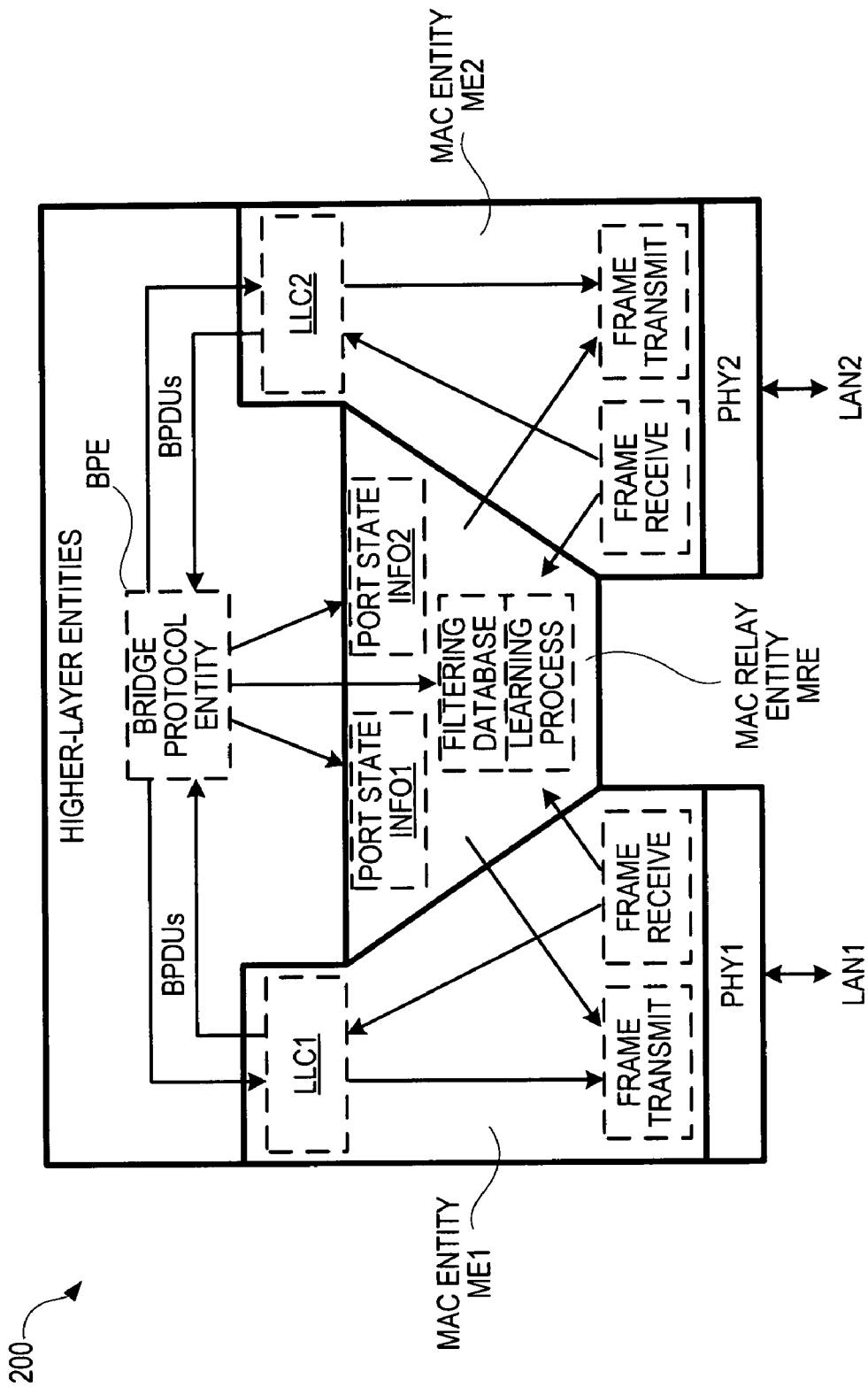
FIG. 2 depicts a generalized prior art bridge functional layout.
Figure 3:
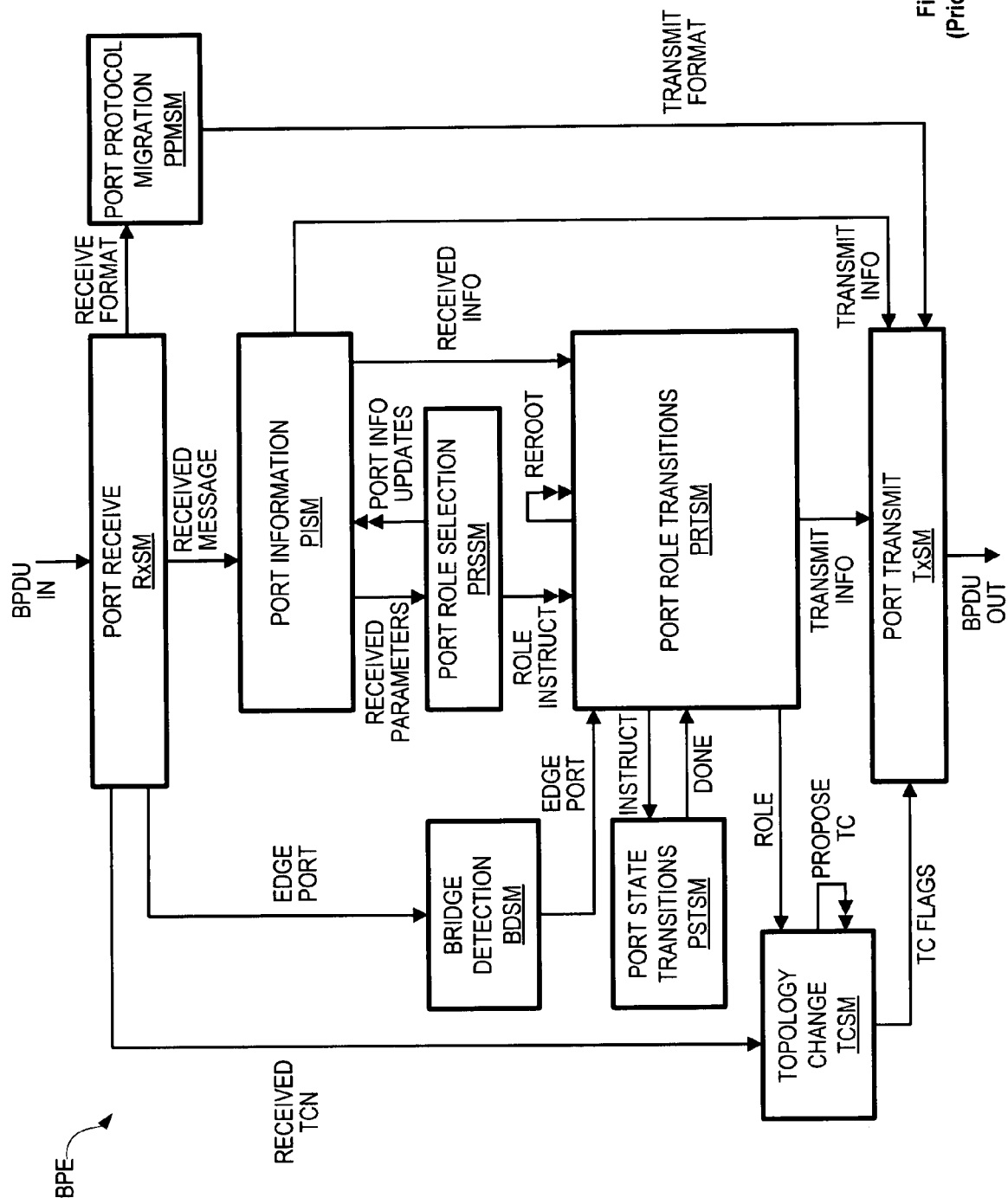
FIG. 3 shows the state machines and state machine interconnections used in a prior art RSTP or MSTP implementation.

In the IEEE 802.1D-2004 and IEEE 802.1Q-2005 specifications, RSTP and MSTP switch operation are described within a framework of a group of interconnected state machines. FIG. 3 illustrates, for a bridge protocol entity BPE, each of these state machines and the general types of parameters/semaphores used to communicate information between the state machines. The state machines include a port receive state machine RxSM, a port protocol migration state machine PPMSM, a port information state machine PISM, a port role selection state machine PRSSM, a port role transitions state machine PRTSM, a port state transitions state machine PSTSM, a port transmit state machine TxSM, a bridge detection state machine BDSM, and a topology change state machine TCSM. A group of bridge and port parameters/semaphores (not shown in FIG. 3) are maintained in memory. When one of the state machines shown in FIG. 3 is activated, it accesses the appropriate parameters/semaphores for its context, which context generally includes a port (for RSTP) or a port and instance (for MSTP). The one exception from single-context processing is the functionality of the port role selection state machine PRSSM. The PRSSM is generally tasked with deciding what role each switch port should fill in the spanning tree based on information from multiple ports, and therefore PRSSM considers more than one context at a time. The function of each state machine will now be described.

The port receive state machine RxSM receives BPDUs transmitted to the switch from other switches' spanning tree protocol entities. Each such BPDU follows the format previously shown for MSTP, or a slightly simpler format for RSTP. State machine RxSM verifies that the BPDU is in a legal format, and parses the fields of each received BPDU into port-specific state parameters. For instance, the receive format of the BPDU is detected, and RxSM sets an appropriate semaphore to the port protocol migration state machine PPMSM to notify PPMSM of the type of BPDUs that are being received on the port. Likewise, the state of the topology change flags in the BPDU is detected, and RxSM sets an appropriate semaphore to the topology change state machine TCSM when the BPDU indicates a topology change notification or acknowledgment on the port. Also, RxSM can set an edge port semaphore to the bridge detection state machine BDSM. Finally, RxSM notifies the port information state machine PISM that a message has been received and that the port/bridge parameters contained therein should be processed.

The port protocol migration state machine PPMSM is assigned the task of determining an appropriate BPDU format for the BPDUs sent out on each port. PPMSM uses indications from RxSM as to the incoming BPDU format on each port to determine a matching format for outgoing BPDUs. A transmit format parameter set by PPMSM is used by the port transmit state machine TxSM to build appropriate outgoing BPDUs for each port.

The bridge detection state machine BDSM is assigned the task of declaring whether a bridge is connected to each port, according to manual setting ("no bridge allowed") or automatic detection based on the absence of incoming BPDU traffic. Ports that do not connect to another bridge ("edge ports") are indicated to the port role transitions state machine PRTSM, which can use this information to set the port role of edge ports to designated.

The topology change state machine TCSM is used to propagate topology change notifications throughout the network and flush affected entries from the forwarding database. When a TCN is reported by RxSM for a port, state machine TCSM causes TCNs to be issued out the other bridge ports in the spanning tree.

The port information state machine PISM compares information received in BPDU configuration messages to the information already stored for a port. The stored port information also ages if not confirmed by receiving additional BPDUs. State machine PISM prompts the port role selection state machine PRSSM, the port role transitions state machine PRTSM, and the port transmit state machine TxSM to respond appropriately when port information changes or ages out.

The port role selection state machine PRSSM uses the root path, port, and bridge priority vectors to calculate and assign a role to each port on the bridge. When PISM instructs PRSSM to reselect a role for a port, PRSSM recalculates the port roles for all ports and instructs the port role transitions state machine PRTSM of any new port roles for any ports.

The port role transitions state machine PRTSM allows each port to transition from one role (disabled, root, designated, or alternate) to another role in an orderly fashion. PRTSM uses the port state transitions state machine PSTSM to transition between discarding, learning, and forwarding port states, if necessary for a given role transition. The port state transitions state machine prevents PRTSM from transitioning a port to a new role until any required state transition has been achieved.

The port transmit state machine TxSM is responsible for generating BPDUs on each bridge port participating in the spanning tree. State machine TxSM includes a hello timer, and insures that at least one BPDU is transmitted on each port every HelloTime seconds. TxSM will also transmit unscheduled BPDUs on a port in response to instructions received from state machines PISM, PRTSM, and TCSM.

Figure 4:
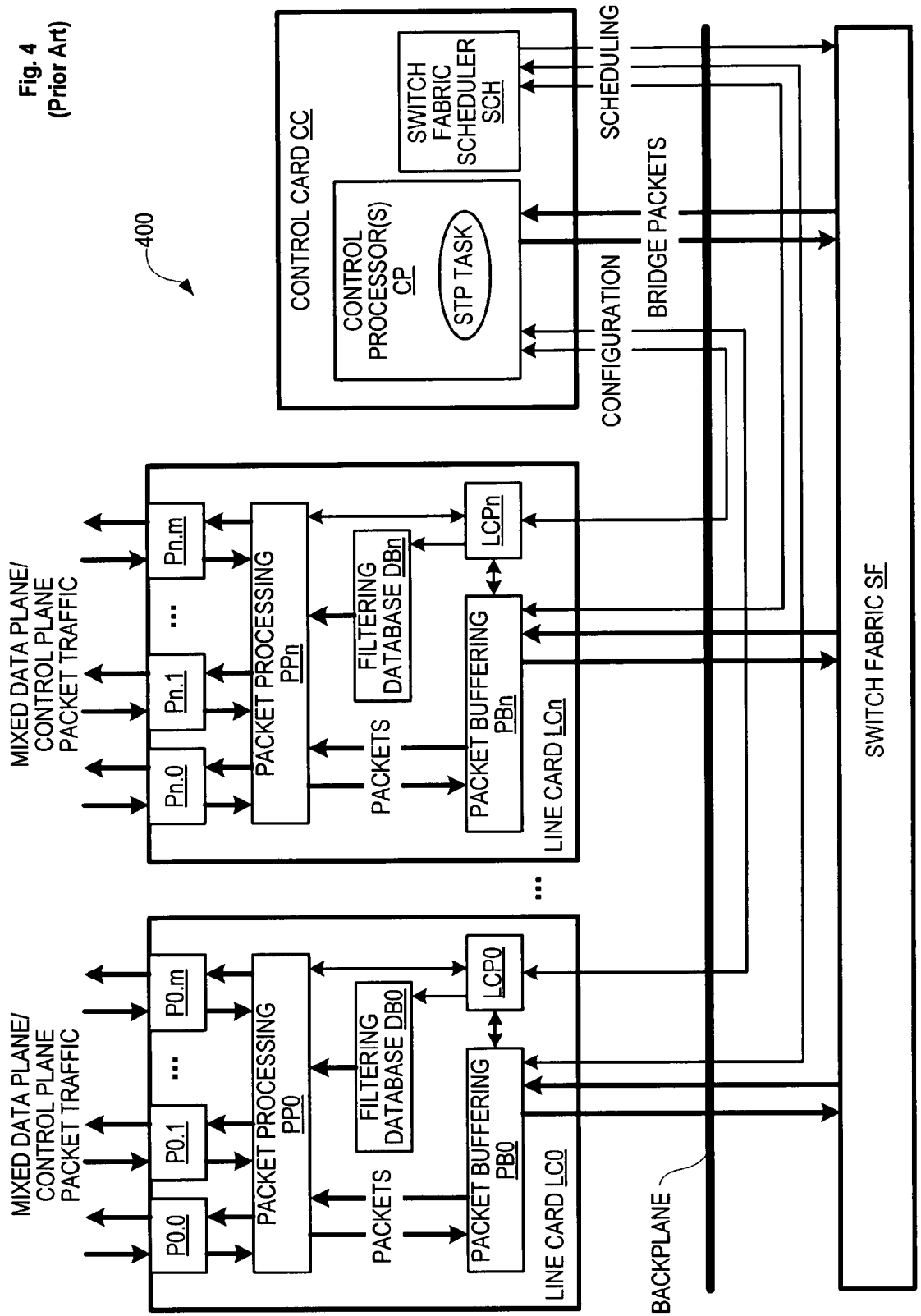
FIG. 4 contains a block diagram for a prior art modular packet switch.

FIG. 4 contains a block diagram for a modular packet switch 400 comprising line cards LC0 to LCn, a control card CC, a switch fabric SF, and a backplane, e.g., an electrical circuit board with connectors for attaching one or more line cards, one or more control cards, and one or more switch fabric cards.

Each line card and control card can pass packets through switch fabric SF to a destination line card or control card. A scheduling bus allows each line card and control card to indicate to a switch fabric scheduler SCH, on control card CC, of destination cards for which it has packets waiting. Scheduler SCH uses these requests to repeatedly configure switch fabric SF to satisfy the requests. Scheduler SCH notifies the line cards and control cards of the switch fabric configuration schedule, and expects the line cards and control cards to place the correct packets on their backplane switch fabric connections at the correct schedule time to reach their destinations.

Taking line card LC0 as exemplary, the line card comprises one or more line ports, e.g., ports P0.0 to P0.*m* on LC0. Each such port allows line card LC0 to form a connection to another switch or end station (or multiple access LAN for some media types). A packet processor PP0 performs MAC sublayer processing for packets received from or transmitted by the ports. A filtering database DB0 contains entries that allow packet processor PP0 to determine a destination card and port for each received packet. The packets are queued in a packet buffering engine PB0, which communicates with the aforementioned scheduler in order to transfer the buffered packets across the switch fabric SF to the appropriate destination card. Once the packets arrive at the destination card, they are buffered again until they can be supplied to the packet processing engine for transfer to the correct outgoing port(s).

The control card CC also contains, in addition to the switch fabric scheduler, one or more control processors CP. The control processors manage and configure the switch chassis components and the high-level bridge (e.g. STP) and/or routing (e.g. Open Shortest Path First) protocols administered by the switch. A configuration channel on the backplane (an Ethernet party bus, management bus, or dedicated connection to each line card, for instance) allows the control processor CP to configure the line cards through a line card processor located on each line card (LCP0 on line card LC0, LCPn on line card LCn, etc.).

On modular packet switch 400, operation of a spanning tree protocol is as follows. According to forwarding entries in the line card filtering databases DB0 and DBn, BPDU packets arriving at the line card ports and addressed to the spanning tree protocol multicast address are buffered for transmission to the control card CC. Scheduler SCH schedules time slots for each line card to transfer the BPDU packets, along with any other packets addressed to the switch itself, to control card CC.

Figure 5:
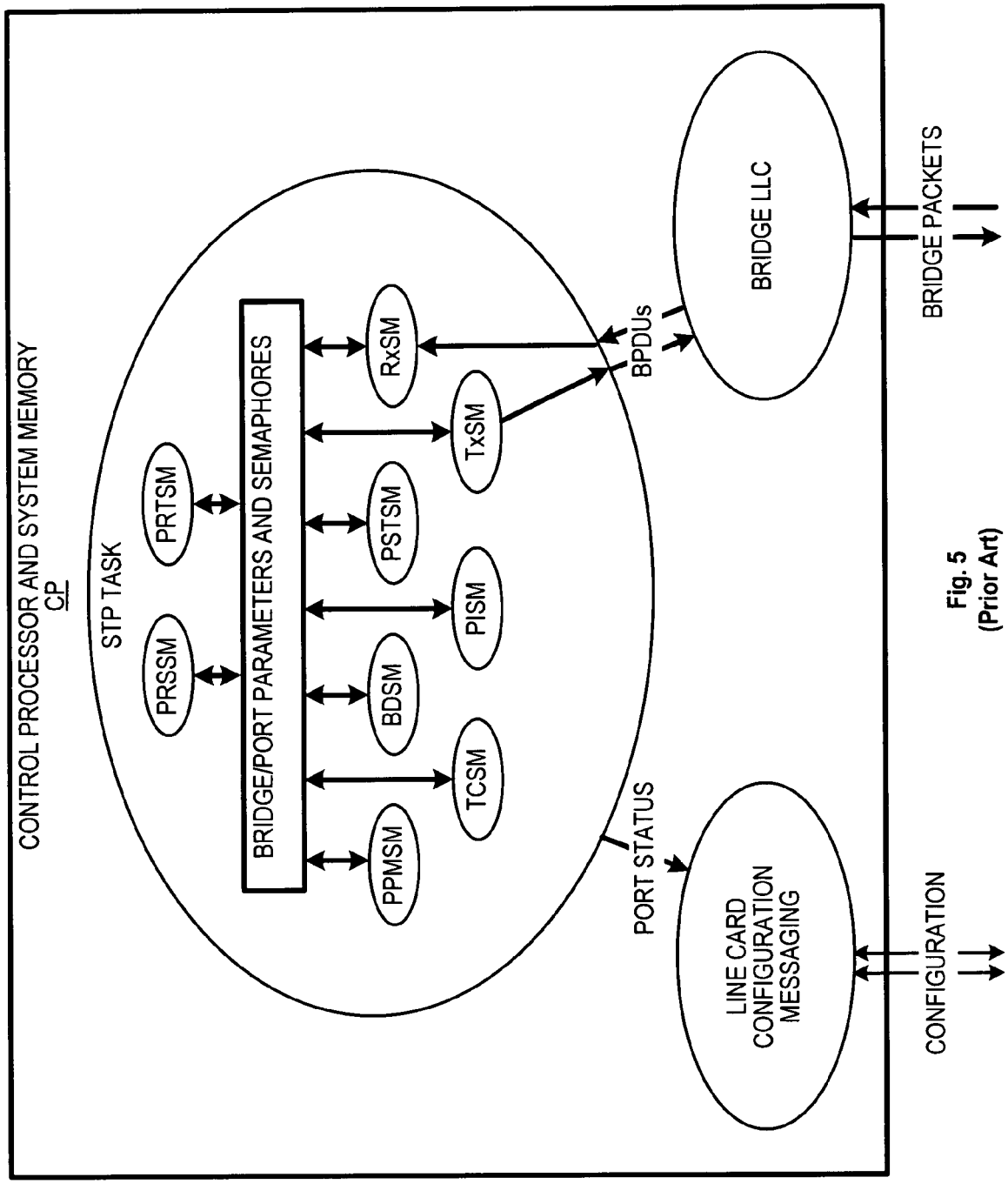
FIG. 5 illustrates spanning tree functionality present in the control module of the modular packet switch of FIG. 4.

FIG. 5 depicts several processes running on the control processor CP (and maintained in system memory), including a bridge LLC sublayer, an STP task, and a line card configuration messaging task. Bridge packets from the line cards are delivered to the bridge LLC sublayer. The bridge LLC sublayer demultiplexes the packets, and supplies spanning tree BPDUs to the STP task RxSM state machine. The STP task operates the various state machines described in conjunction with FIG. 3 on a set of bridge/port parameters and semaphores stored in system memory. When any change in the spanning tree causes a change in a port state (forwarding, discarding, disabled, etc.), a port status message is delivered to the line card configuration messaging task for delivery to the appropriate line card(s). Such a message may instruct the line card to disable or enable a port or set the port to forwarding or discarding. The message may also instruct the line card to flush all or part of its forwarding tables contained in the filtering database.

The port transmit state machine will periodically, and in response to various stimuli as addressed in the FIG. 3 discussion, need to transmit a BPDU on designated ports connected to another switch in the spanning tree. When TxSM creates such a BPDU, it indicates the appropriate line card and port for the BPDU, and delivers the BPDU to the bridge LLC for transfer. Like the line cards, the control card CC must buffer the outgoing BPDUs for transmission across the switch fabric SF according to a time slot assigned by the scheduler. Eventually, the outgoing BPDUs will be supplied to the appropriate outgoing port for transmission across a link to the peer switch.

Some distributed packet switches, including some with an architecture such as that shown in FIG. 4, can support several hundreds of line ports to over a thousand line ports. With increasing port density, sometimes coupled with the increased complexity of MSTP, the control processor may have to dedicate a non-negligible portion of its steady-state processing time, as well as non-negligible numbers of switch fabric scheduling cycles, to processing spanning tree BPDUs. It has now been recognized that, at least in a stable network topology, there is little benefit in a distributed packet switch to having the BPDUs processed by a central collection of spanning tree state machines as taught by the RSTP and MSTP specifications. Accordingly, in the following embodiments, functions found in one or more of the spanning tree state machines are offloaded to the line card processors serving a particular group of line ports. This allows the spanning tree process to scale better, as the addition of each line card also adds processing power to support the spanning tree protocol running on the line ports of that line card, and does not penalize the switch fabric by requiring time slots for transferring BPDUs back and forth to the control card.

Figure 6:
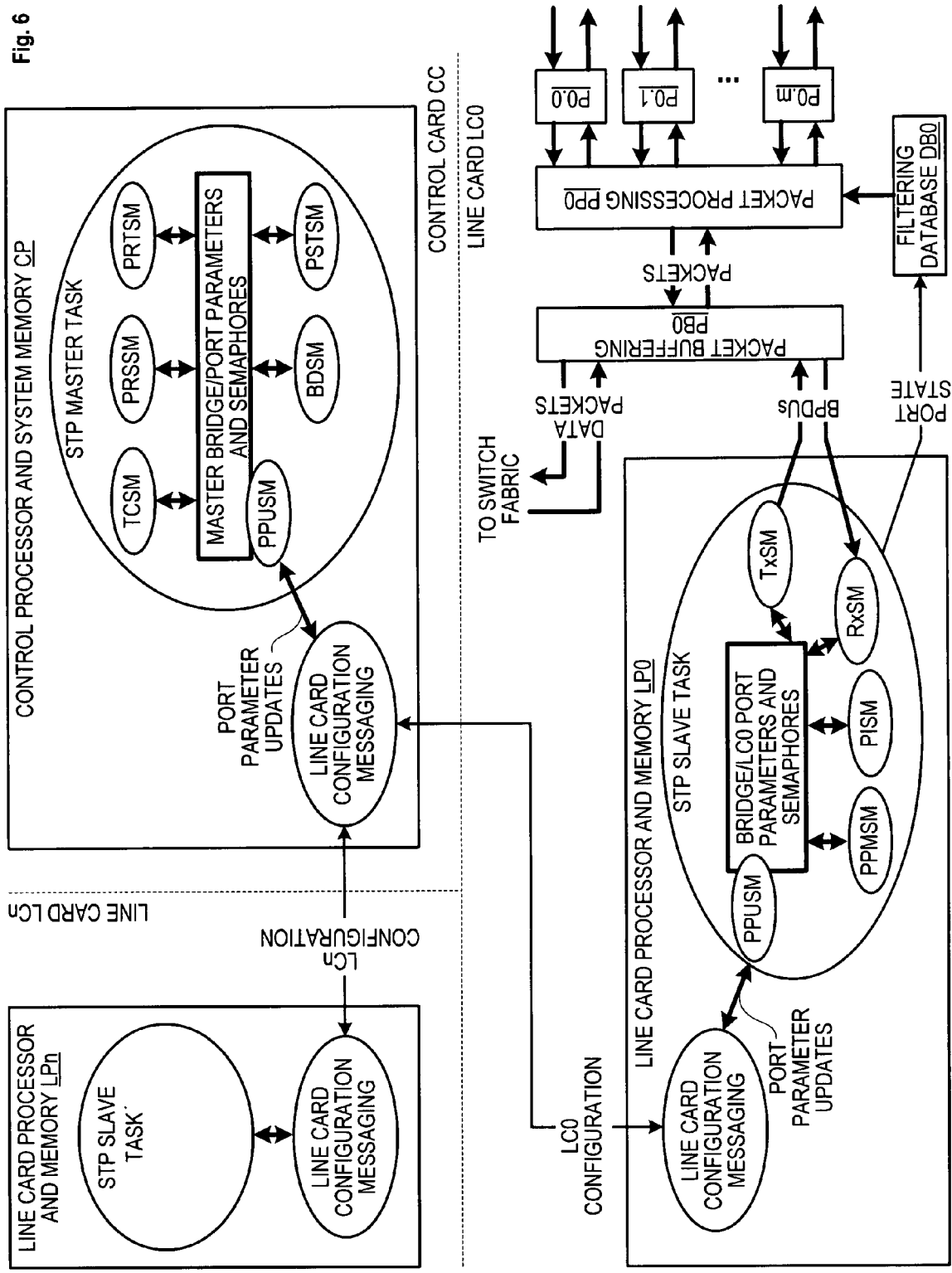
FIG. 6 contains a block diagram for a control card module and line card module of a modular packet switch according to an embodiment.

FIG. 6 illustrates a block diagram for one embodiment of a modular packet switch implementing a distributed spanning tree protocol. Only the implicated blocks of the control card CC and line card LC0, and the LCP of line card LCn, are illustrated for clarity. It is understood that other line modules and/or control modules may be included, as well as a backplane and switch fabric functionality.

The FIG. 6 line card LC0 contains a modified filtering database DB0. For at least some of the line ports P0.0 to P0.$m$, the filtering database DB0 instructs packet processing PP0 to forward received BPDUs to the line card processor (and attached memory) LP0. The BPDUs may or may not pass through the packet buffering engine PB0 in order to reach the line card processor, depending on the implementation. Preferably, however, the BPDUs do not have to be scheduled across the switch fabric to reach the line card processor.

The line card processor LC0 runs a spanning tree protocol slave task. The STP slave task maintains a set of bridge and port parameters/semaphores specific to the LC0 ports for which BPDUs are forwarded to LC0. The STP slave task also runs five state machines in this example: a port receive state machine RxSM, a port transmit state machine TxSM, a port protocol migration state machine PPMSM, a port information state machine PISM, and a port parameter update state machine PPUSM. Of these state machines, all but the PPUSM implement functionality previously described for a centralized spanning tree protocol process, with the following caveats.

The port receive state machine RxSM communicates with PPMSM and PISM, as in a standalone STP implementation, but using the local port parameters and semaphores. Should RxSM need to set a semaphore for the bridge detection state machine or topology change state machine, however, these state machines do not exist in the STP slave task. Instead, the port parameter update state machine PPUSM is employed to relay semaphore setting instructions to an STP master task executing on the control processor CP. The semaphores remain set for the STP slave task until a semaphore clear instruction is received back from the STP master task. As shown in FIG. 6, the STP master task also contains its own port parameter update state machine PPUSM to communicate with the STP slave task PPUSM for this purpose. The two PPUSM instantiations communicate with each other using the line card configuration messaging channel for line card LC0. In a stable network topology, however, there should be little or no need for the port receive state machine to communicate with the remote TCSM and BDSM state machines.

The port protocol migration state machine operates on data from RxSM to set a transmit format for TxSM on a per-port basis. As such, PPMSM can operate on the slave task with only a small set of parameters supplied by the STP master task. These parameters will change rarely, if ever. Accordingly, the STP master task PPUSM state machine can transfer these parameters at startup to the STP slave task for usage by PPMSM.

The port information state machine PISM compares information from received BPDUs with its stored parameters, which it also ages. Unless the received BPDUs differ from the stored parameters, or the stored parameters age out, PISM can run on the STP slave task while only responding to signals from RxSM, and thus need not communicate with the STP master task in a stable topology. Should the port parameters change, however, PISM triggers PPUSM to relay a semaphore setting instruction to the STP master task, requesting that the STP master task reselect the affected port's role. PPUSM also relays the changes to the port parameters in PISM to the STP master task. The STP master task runs a port role selection state machine PRSSM on the changed parameters, and may return, to the slave task, updates to port information for the affected port and/or other ports on line card LC0. PISM may also set semaphores to the port role transitions state machine on the STP master task to reflect negotiation flags set in the BPDUs.

The STP slave task also runs a port transmit state machine TxSM for the LC0 ports that it is assigned. TxSM will periodically generate BPDUs for each of the designated ports on the line card, using the locally saved bridge and LC0 port parameters, and without instruction from the STP master task. TxSM can, however, be prompted to generate an unscheduled BPDU by PISM, or by PRISM or TCSM running on the STP master task, with the latter two setting a semaphore on the STP slave task via the PPUSM state machines. When a BPDU is generated, it is transmitted to the appropriate line port through the packet processor PP0, with intermediate storage in packet buffering engine PB0, if appropriate to the implementation.

In a typical implementation, other line cards/modules will be present, and will run an STP slave task like the one described for LC0, except with port parameters and semaphores particular to that line card. The PPUSM running in the STP master task communicates with each STP slave task separately, or broadcasts its updates to all line card processors, relying on the slave tasks to discard parameter updates that are of no interest. In FIG. 6, an STP slave task is shown on a line card processor and memory LPn, which communicates with the STP master task on control card CC via the line card LCn configuration channel. The LPn STP slave task functions like the LP0 STP slave task, except for the ports (not shown) on line card LPn.

Figure 7:
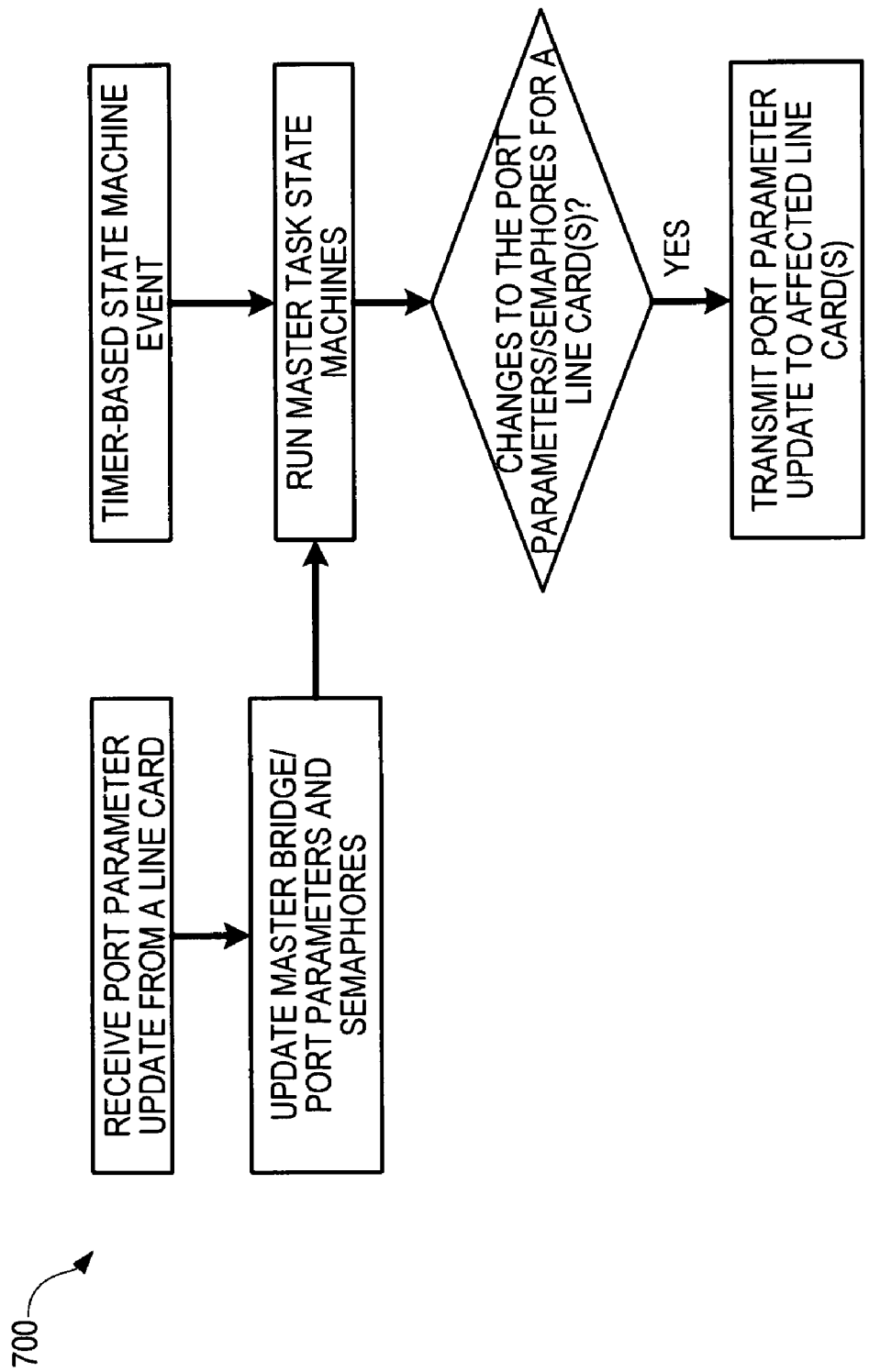
FIG. 7 contains a high-level flowchart for a spanning tree protocol master task operating on the control card module of FIG. 6.

FIG. 7 contains a flowchart 700 for the high-level operations of a STP master task, according to an embodiment. When the STP master task receives a port parameter update from a line card STP slave task, it updates the master bridge/port parameters and semaphores. Generally, this update will trigger an operation on one or more of the master task state machines (or else the STP slave task on the line card would not have sent the update). As the master state machines run, the STP master task evaluates whether changes have occurred that affect the port parameters and/or semaphores maintained on one or more of the line cards. When such changes occur, the STP master task transmits a port parameter update to the affected line card(s).

Several of the state machines in the STP master task also contain timers that may trigger one or more master task state machines. Like with a remote trigger, timer-triggered master task state machine operation may cause a change to the port parameters and/or semaphores for one or more line cards, causing a port parameter update to be transmitted to the affected line card(s).

Figure 8:
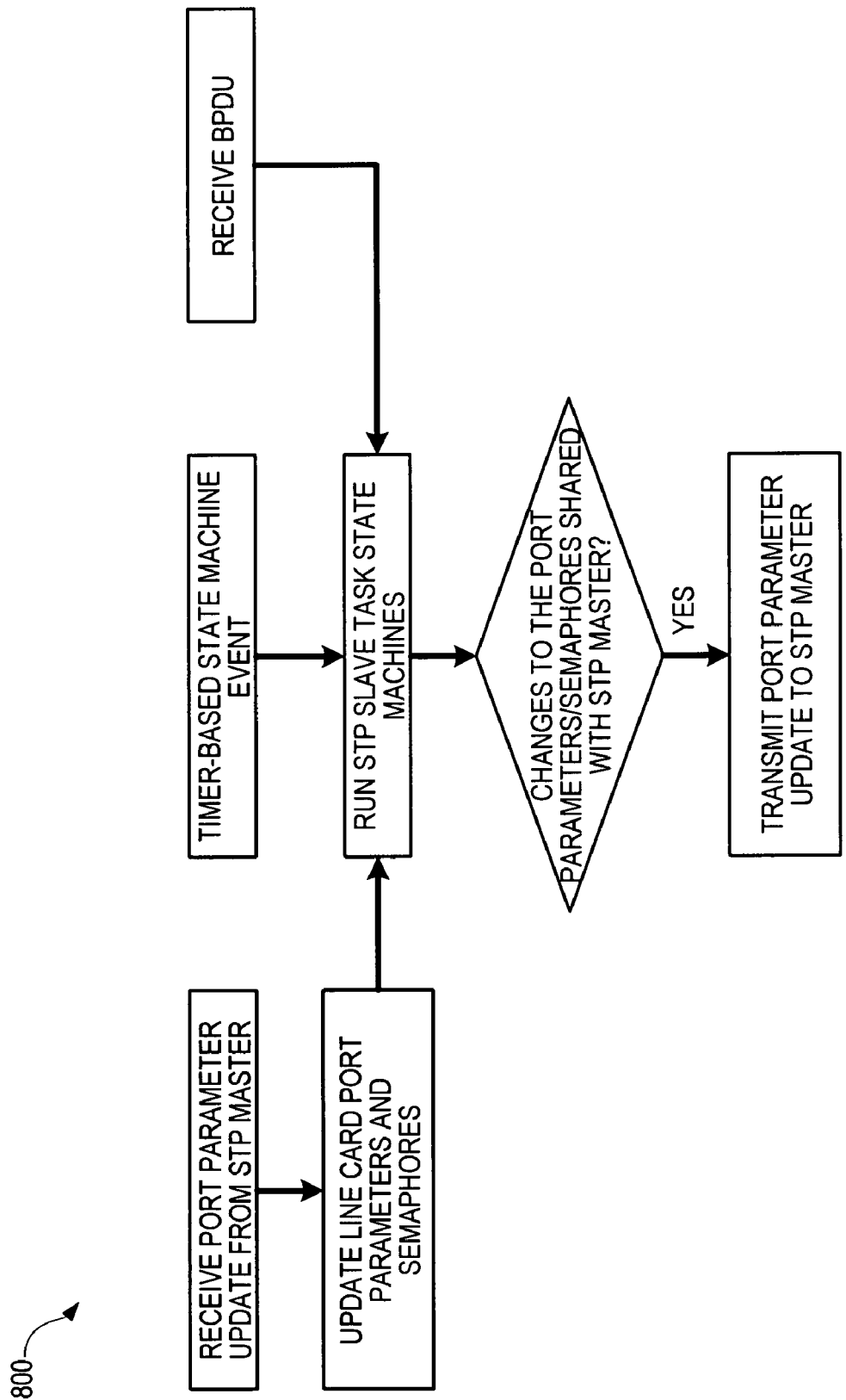
FIG. 8 contains a high-level flowchart for a spanning tree protocol slave task operating on the line card module of FIG. 6.

FIG. 8 contains a flowchart 800 for the high-level operations of a STP slave task, according to an embodiment. When the STP slave task receives a port parameter update from the STP master task, it updates the line card port parameters and semaphores. This update may or may not trigger an operation on an STP slave task state machine. If it does, the affected slave task state machines will run for the affected port(s). The slave task state machines may also be triggered by a timed event (port information aging or the BPDU transmit hello timer, for instance), or by the reception of a BPDU on one of the line card ports. In all of these cases, as the slave state machines run, the STP slave task evaluates whether changes have occurred to the port parameters and/or semaphores shared with the remote STP master task. When such changes occur, the STP slave task transmits a port parameter update to the STP master task.

Figure 9:
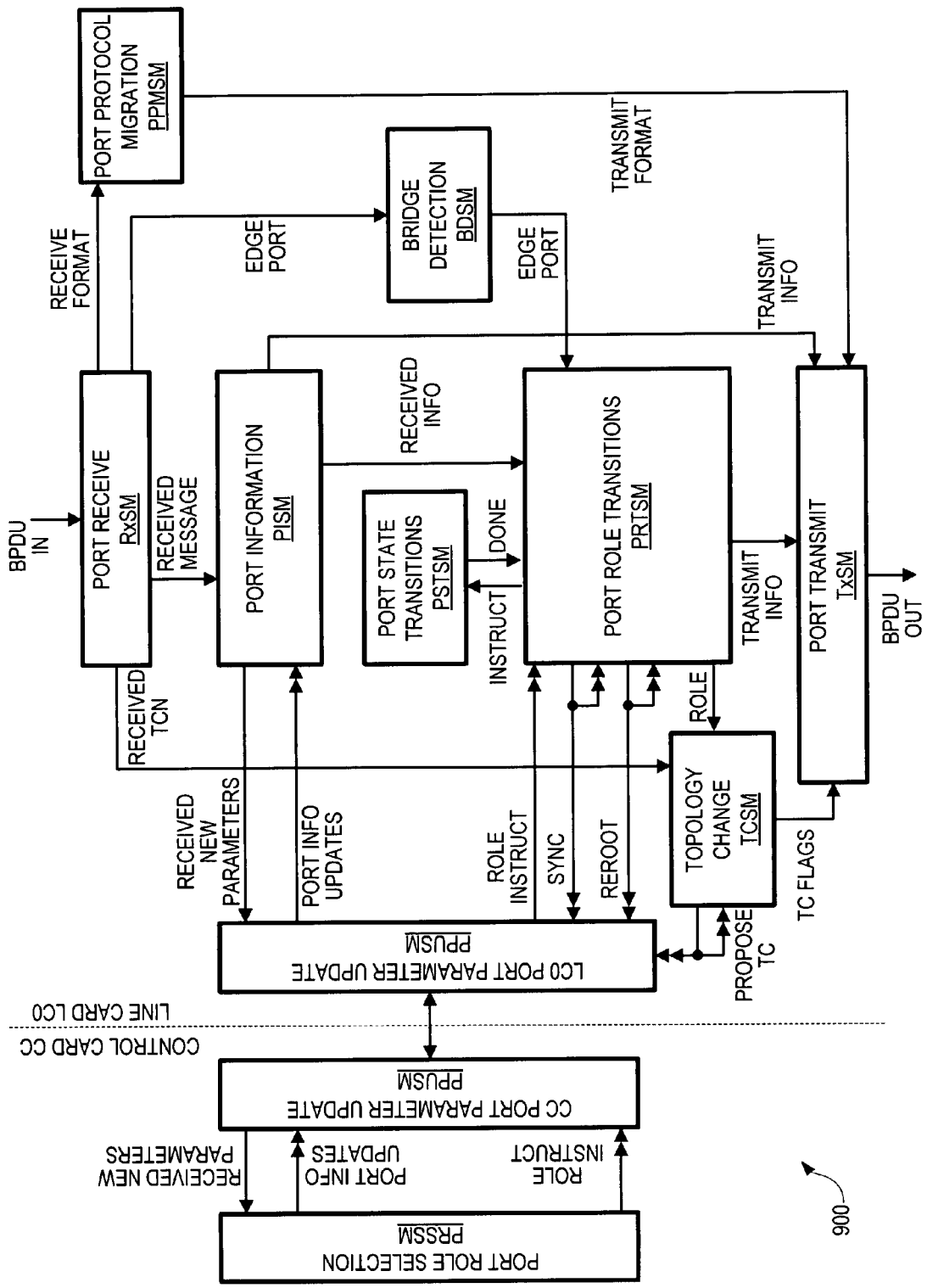
FIG. 9 shows a division of spanning tree protocol state machine functionality between a control card module and a line card module according to another embodiment.

FIG. 9 shows a distributed STP process 900 with an alternate division of state machine functionality between a control card CC and line card LC0. In this implementation, the functionality of essentially every RSTP/MSTP state machine except the port role selection state machine is offloaded to the line cards. Port parameter update state machines PPUSM on the control card and line cards serve a greatly reduced set of functions. First, the port information state machines PISM on the line cards transmit new port priority vectors and port role reselection requests to the port role selection state machine PRSSM on the control card as required. The port role selection state machine PRSSM transmits, back to the line cards, port information updates and port role instructions.

The second function of the port parameter update state machines PPUSM is to propagate several signals from state machines on one line card to their sister state machines on other line cards. These include the sync and reRoot signals generated by the port role transitions state machine, and the tcProp signal generated by the topology change state machine. For these signals, the line card slave process distributes the signals to the parameter groups for other line card ports, as well as transmitting the signals to the master task via the PPUSM state machine. The master task PPUSM state machine distributes sync, reRoot, and tcProp signals to other line cards with ports in the spanning tree.

Some packet switches have the capability to aggregate multiple physical links between two switches into a single logical link. The multiple physical links can be located to ports on a common line card, or can be located on ports on several line cards, if the architecture allows. The distributed STP processing architectures described above are extensible to allow for use with aggregated links.

In the first case (multiple physical links aggregated on the same line card), the STP slave process allows designation of one of the links for association with the port transmit state machine TxSM for the link bundle. The link bundle is otherwise mapped to the same set of STP parameters. Thus a BPDU may be received on any one of the aggregated links, causing the RxSM and PISM state machines to operate on the same set of port parameters.

In the second case (physical links on two or more line cards), a single port transmit state machine is enabled for one of the ports on one of the cards. The link aggregation STP parameters for the port receive state machine are stored on each line card having one or more ports in the aggregation. Each line card transmits parameter changes to the master process, which redistributes the parameter changes to the copies on each line card.

Those skilled in the art will appreciate that the embodiments and/or various features of the embodiments can be combined in other ways than those described. For instance, the STP master task may choose to administer all BPDU processing for some ports and not others on a line card, simply by setting the forwarding tables to send BPDUs received on some ports to the control card and BPDUs received on other ports to the line card processor, and not activating TxSM on the line card for ports that the master task wishes to control directly. Other divisions of per-port spanning tree protocol functionality between a master process and slave processes local to the ports is possible, including port transmit state machine only or port receive state machine only. Such changes may even be varied based on assigned port role, such as by distributing the port transmit state machine to the line cards for designated ports and the port receive state machine to the line cards for root and alternate ports. Spanning tree protocol state machine functions may even be moved, dynamically, from a central location to a line card or vice versa. For instance, when a switch comes alive, or a line card comes alive, the control processor may wait until it has converged the new ports to a stable spanning tree topology, and then transfer some or all port-specific state machine functionality to the line cards.

In an extreme case, even the port role selection state machine PRSSM can be replicated on each line card processor. The STP master task would serve as a synchronization clearing house for multiple copies of bridge and port parameters, one copy stored on each line card. Each PRSSM would independently calculate the same port roles for all ports, as each PRSSM is supplied the same priority vectors, and the roles would not need to be transferred between line cards.

Although a specific packet switch platform has been used to describe several embodiments, the claims are not limited to that platform. Other packet switch architectures with a centrally administered bridge protocol entity, but with distributed processors local to groups of ports that can communicate with the central authority, potentially can be modified according to this disclosure to distribute spanning tree functionality to the local processors. The described embodiments also refer to line cards and control cards and modules, although a single card/module may have multiple instances of line card and/or control card functionality in another embodiment. A state machine may be implemented in software, hardware, or a combination of both.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a packet switch having a control module and at least two line modules each comprising one or more line ports, the method comprising:
    operating a spanning tree protocol master process on the control module, the master process comprised of a first group of spanning tree protocol functions;
    operating a spanning tree protocol slave process on each of the line modules, the slave process on each of the line modules comprised of a second group of spanning tree protocol functions which includes at least one function that is different than the functions comprising the first group, the spanning tree protocol slave process performing at least some Bridge Protocol Data Unit (BPDU) processing for BPDUs associated with the line ports on the line module; and
    operating a synchronization process between the control module and each of the line modules to maintain agreement between the first group of spanning tree protocol functions and the respective second group of spanning tree protocol functions.

2. The method of claim 1, wherein performing at least some BPDU processing for BPDUs associated with the line ports on the line module comprises operating a port transmit state machine to transmit BPDUs on at least some of the line ports on the line module.

3. The method of claim 1, wherein performing at least some BPDU processing for BPDUs associated with the line ports on the line module comprises operating a port receive state machine to receive BPDUs from at least some of the line ports on the line module.

4. The method of claim 1, wherein performing at least some BPDU processing for BPDUs associated with the line ports on the line module comprises operating a port receive state machine to receive BPDUs from the line ports on the line module, and a port transmit state machine to transmit BPDUs on the line ports of the line module.

5. The method of claim 4, further comprising the spanning tree protocol slave process operating at least one other port-specific state machine for the line ports of the line module.

6. The method of claim 5, wherein the at least one other port-specific state machine comprises at least one port-specific state machine selected from the group of state machines consisting of a port protocol migration state machine, a port information state machine, a bridge detection state machine, a port state transitions state machine, a port role transitions state machine, and a topology change state machine.

7. The method of claim 5, wherein the at least one other port-specific state machine comprises a port protocol migration state machine, a port information state machine, a bridge detection state machine, a port state transitions state machine, a port role transitions state machine, and a topology change state machine.

8. The method of claim 1, wherein operating the synchronization process comprises transmitting a synchronization message from the spanning tree protocol master process to a first spanning tree protocol slave process on one of the line modules when a change at the spanning tree protocol master process or at one of the other spanning tree protocol slave processes affects a port served by the first spanning protocol slave process.

9. The method of claim 1, wherein operating the synchronization process comprises transmitting a synchronization message from a first spanning tree protocol slave process on one of the line modules to the spanning tree protocol master process when a change at the first spanning tree protocol slave process affects the spanning tree protocol master process or one of the other spanning tree protocol slave processes.

10. The method of claim 1, wherein at least a first port on a first one of the at least two line modules and a second port on a second one of the at least two line modules are aggregated into a common logical link, wherein the spanning tree protocol slave processes on each of the first and second line modules are each configured to receive BPDUs for the common logical link, the synchronization process synchronizing the local copies of the spanning tree protocol parameters for the first and second ports on the first and second line modules.

11. The method of claim 10, further comprising designating one of the first and second line module spanning tree protocol slave processes to transmit BPDUs for the logical link.

12. The method of claim 1, wherein the spanning tree protocol comprises functionality to operate ports in a Rapid Spanning Tree Protocol environment and in a Multiple Spanning Tree Protocol region.

13. The method of claim 1, wherein the first set of spanning tree protocol functions is comprised of one or more of a topology change state machine, a port role selection state machine, a port role transitions state machine, a port parameter update state machine, a bridge detection state machine and a port state transitions state machine.

14. The method of claim 1, wherein the second set of spanning tree protocol functions is comprised of one or more of a port parameter update state machine, a port protocol migration state machine, a port information state machine, a receive state machine and a transmit state machine.

15. A packet switch comprising:
- a control module having a control processor operating a spanning tree protocol master process comprised of a first group of spanning tree protocol functions;
- a first line module having a plurality of first line ports and a first line module processor operating a first spanning tree protocol slave process which is comprised of a second group of spanning tree protocol functions at least one function of which is different than the functions comprising the first group, the first spanning tree protocol slave process performing at least some Bridge Protocol Data Unit (BPDU) processing for BPDUs associated with at least one of the first line ports:
- a second line module having a plurality of second line ports and a second line module processor operating a second spanning tree protocol slave process which is comprised of the second group of spanning tree protocol functions at least one function of which is different than the functions comprising the first group, the second spanning tree protocol slave process performing at least some BPDU processing for BPDUs associated with at least one of the second line ports; and
- a configuration communication channel for communicating configuration information between at least the control module and the first line module, and the control module and the second line module, the spanning tree protocol master process using the configuration communication channel to maintain synchronization between itself and the first and second spanning tree protocol slave processes.

16. The packet switch of claim 15, wherein the first spanning tree protocol slave process comprises a port transmit state machine to transmit BPDUs on at least one of the first line ports.

17. The packet switch of claim 15, wherein the first spanning tree protocol slave process comprises a port receive state machine to receive BPDUs on at least one of the first line ports.

18. The packet switch of claim 15, wherein the first spanning tree protocol slave process comprises a port transmit state machine, a port receive state machine, a port protocol migration state machine, a port information state machine, a bridge detection state machine, a port state transitions state machine, a port role transitions state machine, a topology change state machine, and a port parameter update state machine, the port parameter update state machine using the configuration communication channel to alert the spanning tree protocol master process when a change that affects the spanning tree protocol master process or the second spanning tree protocol slave process occurs to one or more port parameters controlled by the first spanning tree protocol slave process.

* * * * *